US008969822B2

United States Patent
Utukuri et al.

(10) Patent No.: US 8,969,822 B2
(45) Date of Patent: *Mar. 3, 2015

(54) TWO-DIMENSIONAL AND THREE-DIMENSIONAL POSITION SENSING SYSTEMS AND SENSORS THEREFOR

(75) Inventors: Avanindra Utukuri, Mississauga (CA); Jonathan Clarke, North York, CA (US); Stephen McFadyen, Toronto (CA)

(73) Assignee: Baanto International Ltd., Mississauga (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/329,215

(22) Filed: Dec. 16, 2011

(65) Prior Publication Data

US 2012/0267541 A1  Oct. 25, 2012

Related U.S. Application Data

(63) Continuation of application No. PCT/CA2010/000884, filed on Jun. 16, 2010.

(60) Provisional application No. 61/187,653, filed on Jun. 16, 2009.

(51) Int. Cl.
*H01L 25/00* (2006.01)
*H01L 27/00* (2006.01)
*G01D 5/34* (2006.01)
*G01S 3/784* (2006.01)
*G01S 5/16* (2006.01)

(52) U.S. Cl.
CPC . *G01D 5/34* (2013.01); *G01S 3/784* (2013.01); *G01S 5/16* (2013.01)

USPC .................................................. 250/370.1

(58) Field of Classification Search
CPC ......... G01J 1/1626; G01J 1/4228; G01J 1/42; G01J 1/0214; G01J 1/0411; G01J 1/0437; G01C 1/00
USPC ........................................................ 250/394
See application file for complete search history.

(56) References Cited

U.S. PATENT DOCUMENTS

| 3,951,550 A | 4/1976 | Slick |
| 4,874,937 A | 10/1989 | Okamata |

(Continued)

FOREIGN PATENT DOCUMENTS

| JP | S62-211506 A | 9/1987 |
| WO | 03/038468 A2 | 5/2003 |
| WO | 2004/081502 A2 | 9/2004 |

OTHER PUBLICATIONS

International Preliminary Report on Patentability for PCT/CA2010/000884, published Dec. 16, 2011.

(Continued)

*Primary Examiner* — David Porta
*Assistant Examiner* — Carolyn Igyarto

(57) ABSTRACT

Two and three dimensional position sensing systems and sensors for use in such systems are disclosed. The sensors incorporate linear array sensors and an aperture plate to block light or other radiation from reaching most elements of the sensors. A direction of a radiation source relative is determined based on illuminated sensor elements in each sensor. The sensors are combined in systems to allow the position of a radiation source to be estimated.

7 Claims, 7 Drawing Sheets

(56) References Cited

U.S. PATENT DOCUMENTS

| | | | |
|---|---|---|---|
| 5,455,415 A | 10/1995 | Yamada | |
| 5,757,478 A | 5/1998 | Ma | |
| 6,141,104 A | 10/2000 | Schulz et al. | |
| 6,545,751 B2 * | 4/2003 | Beliveau et al. | 356/141.4 |
| 6,862,087 B2 | 3/2005 | Kuroda et al. | |
| 2002/0153488 A1 * | 10/2002 | Utukuri et al. | 250/342 |
| 2005/0007504 A1 | 1/2005 | Fergason | |
| 2006/0165312 A1 | 7/2006 | Odell | |

OTHER PUBLICATIONS

Written Opinion of the ISR for PCT/CA2010/000884, published Nov. 29, 2010.

Patent Abstracts of Japan, English Translation of Abstract of JP-S62-211506, published Sep. 17, 1987.

* cited by examiner

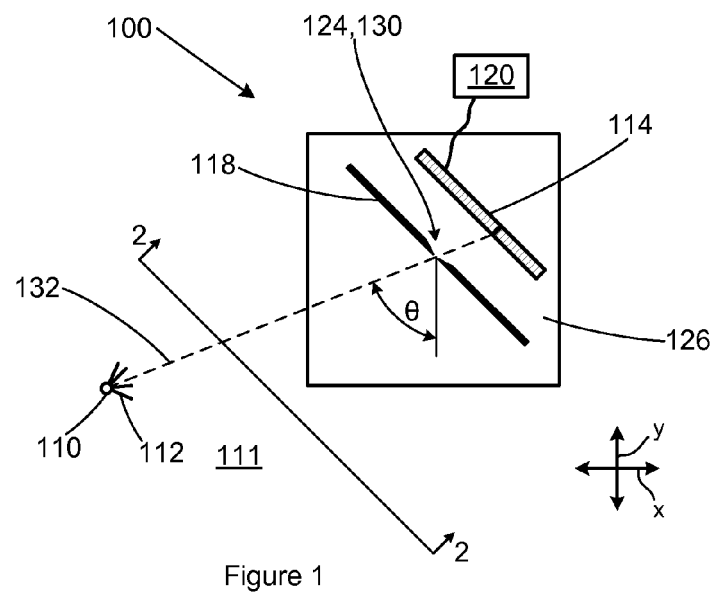
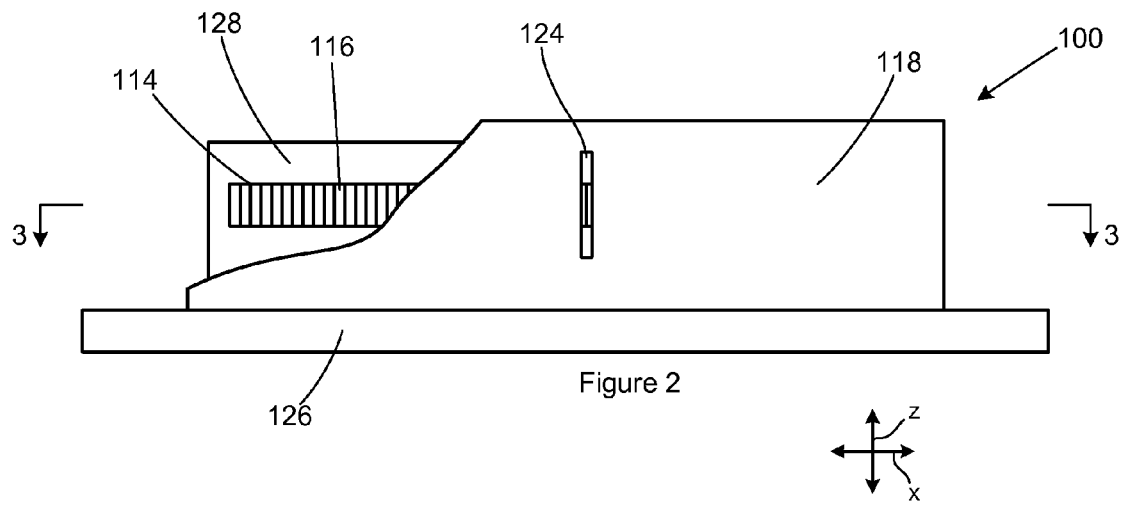

TWO-DIMENSIONAL AND THREE-DIMENSIONAL POSITION SENSING SYSTEMS AND SENSORS THEREFOR

FIELD

The described embodiments relate to systems and methods for sensing the position of a radiation source or a radiation blocking object in two or three dimensions. The embodiments also relate to sensors for use in such systems and methods.

SUMMARY

Some embodiments of the invention provide sensors for estimating the direction of an object relative to the sensor. A radiation source emits generated or reflected radiation towards a sensor. The sensor has a linear optical sensor array behind an aperture plate. The sensor array has a plurality of sensor elements arranged linearly. The aperture plate has an aperture to allow radiation from the radiation source to reach only some of the sensor elements when the system is in use. An intensity signal from the sensor is coupled to a processor which is configured to identify sensor elements upon which the radiation is incident. A center sensor element is chosen from among the illuminated sensor elements and is used to estimate the direction of the radiation source relative to the sensor.

Other embodiments provide a sensor with a pair of sensor arrays. The sensor arrays are not co-linear and may be arranged orthogonally to one another. Radiation from a radiation source is incident on both sensor arrays through respective apertures in an aperture plate. A processor receives an intensity signal from each sensor array and calculates a line based on the intensity signals. The radiation source lies on or near the line.

In another aspect, the invention provides a three-dimensional position sensing system. In one embodiment, three sensors receive radiation from a radiation source. A processor calculates three planes based on radiation incident on each sensor. A radiation source lies on or near the three planes and is estimated to be at the intersection of the planes. In some embodiments, two of the sensors may be combined into a single sensor having two sensor arrays arranged orthogonally to one another.

In another embodiment, a pair of sensors, each having two sensor arrays are used to estimate a pair of lines. A radiation source is on or near each of the lines and is estimated to lie at the mid-point of the shortest line segment between the two lines.

One aspect provides a method of estimating the direction of a radiation source positioned in a sensing region, the method comprising: providing a two-dimensional radiation sensor, the radiation sensor comprising: a first linear array sensor having a plurality of first sensor elements arranged linearly, the first sensor elements facing a sensing region; a second linear array sensor having a plurality of second sensor elements arranged linearly, the second sensor elements facing the sensing region; an aperture plate positioned between the linear array sensor and the sensing region to block radiation from the sensing region from reaching the linear array sensor; a first aperture formed in the aperture plate to allow radiation from the sensing region to reach some of the first sensor elements; and a second aperture formed in the aperture plate to allow radiation from the sensing region to reach some of the second sensor elements; receiving a first intensity signal from the first linear array sensor, wherein the first intensity signal includes first intensity values corresponding to radiation incident on the first sensor elements through the first aperture; receiving a second intensity signal from the second linear array sensor, wherein the second intensity signal includes second intensity values corresponding to radiation incident on the second sensor elements through the second aperture; and determining the direction based on the first and second intensity signals.

In some embodiments, the first radiation intensity signal includes at least one high intensity value exceeding a first threshold value; the second radiation intensity signal includes at least one high intensity value exceeding a second threshold value; and the direction is determined based on the high intensity values in the first and second radiation intensity signals.

In some embodiments the first radiation intensity signal includes a range of high intensity values exceeding a first threshold value; and the second radiation intensity signal includes a range of high intensity values exceeding a second threshold value; and wherein determining the direction includes: selecting a first center sensor element based on the range of high intensity values in the first radiation intensity signal; selecting a second center sensor element based on the range of high intensity values in the second radiation intensity signal; and determining a direction based on the first and second center sensor element.

In some embodiments the first and second radiation intensity signals are analog signals and wherein determining the direction includes: converting the first radiation intensity signal into a corresponding first final radiation intensity signal; converting the second radiation intensity signal into a corresponding second final radiation intensity signal; and determining the direction based on the first and second final radiation intensity signals.

In some embodiments the first and second radiation intensity signals are digital signals having either a high value or a low value corresponding respectively to each of the first and second sensor elements and wherein determining the direction includes: selecting a first center sensor element based on a range of high intensity values in the first radiation intensity signal; selecting a second center sensor element based on a range of high intensity values in the second radiation intensity signal; and determining a direction based on the first and second center sensor elements.

In some embodiments the method includes filtering the first and second radiation intensity signals to remove spurious values before determining the direction.

In some embodiments determining the direction includes looking up a first angle corresponding to the first radiation intensity signal in a lookup table and looking up a second angle corresponding to the second radiation intensity signal in a lookup table.

In some embodiments determining the direction includes calculating a first angle and calculating a second angle.

In some embodiments the first and second angles are combined to determine the direction.

Another aspect provides a method of estimating the position of a radiation source in a three-dimensional space, the method comprising: positioning a two-dimensional sensor in a first position relative to the three-dimensional space; positioning a one-dimensional sensor in a second position relative to the three-dimensional space, wherein the first and second position sensors are separated by a distance; determining a ray relative to two-dimensional sensor; determining a plane relative to the one-dimensional position sensor; and estimating the position of radiation source to be at the intersection of the plane and the ray.

Another aspect provides a method of estimating the position of a radiation source in a three-dimensional space, the method comprising: positioning a first one-dimensional sensor in a first position relative to the three-dimensional space; positioning a second one-dimensional sensor in a second position relative to the three-dimensional space; positioning a third one-dimensional sensor in a third position relative to the three-dimensional space; determining a first plane relative to the first position sensor; determining a second plane relative to the second position sensor; determining a third plane relative to the third position sensor; and estimating the position of the radiation source to be at the intersection of the three planes.

In some embodiments each of the first, second and third one-dimensional sensors includes a linear array sensor, and wherein the linear array sensor of the third one-dimensional sensor is positioned orthogonally to the linear array sensor of the first one-dimensional sensor.

In some embodiments the linear array sensors of the first and second one-dimensional sensors are positioned co-linearly.

Another aspect provides a method of estimating the position of a radiation source in a three-dimensional space, the method comprising: positioning a first two-dimensional sensor in a first position relative to the three-dimensional space; positioning a second two-dimensional sensor in a second position relative to the three-dimensional space; determining a first ray relative to the first two-dimensional sensor; determining a second ray relative to the second two-dimensional sensor; estimating the position of the radiation based on the first and second rays.

In some embodiments the position of the radiation source is estimated to be on a shortest line segment between the first and second rays.

In some embodiments the position of the radiation source is estimated to be at the midpoint of the line segment.

Another aspect provides a two-dimensional sensor comprising: a first linear array sensor having a plurality of first sensor elements arranged linearly, the first sensor elements facing a sensing region; a second linear array sensor having a plurality of second sensor elements arranged linearly, the second sensor elements facing the sensing region; an aperture plate positioned between the linear array sensor and the sensing region to block radiation from the sensing region from reaching the linear array sensor; first aperture formed in the aperture plate to allow radiation from the sensing region to reach some of the first sensor elements; and a second aperture formed in the aperture plate to allow radiation from the sensing region to reach some of the second sensor elements.

In some embodiments the first and second linear array sensors are arranged orthogonally.

In some embodiments the sensor includes a processor coupled to the first linear array sensor to: receive a first radiation intensity signal from the first linear array sensor, wherein the first radiation intensity signal corresponds to the intensity of radiation incident on a range of first sensor elements through the first aperture; and receive a second radiation intensity signal from the second linear array sensor, wherein the second radiation intensity signal corresponds to the intensity of radiation incident on a range of second sensor elements through the second aperture.

In some embodiments the sensor includes a first optical filter to filter radiation reaching the first sensor elements and a second optical filter to filter radiation reaching the second sensor elements.

In some embodiments the sensor elements are sensitive to radiation emitted by a radiation source in the sensing region and wherein the optical filter is selected to allow radiation emitted by the radiation source to reach the sensor elements.

In some embodiments the processor is configured to estimate a direction relative to the position sensor in response to the first and second radiation intensity signals.

These and other aspects of the invention are described below in a description of the some example embodiments of the invention.

BRIEF DESCRIPTION OF THE DRAWINGS

Various embodiments of the invention will now be described with reference to the drawings, in which:

FIG. 1 illustrates a sensor according to the present invention;

FIG. 2 is a partial cut-away front view of the sensor of FIG. 1;

The drawings are illustrative only and are not drawn to scale.

DESCRIPTION OF EXEMPLARY EMBODIMENTS

Exemplary embodiments described herein provide details relating to optical sensor systems and methods for determining the position of a radiation source or radiation blocking object. Other exemplary embodiments describe details of whiteboard systems for tracking the movement of a pen or other object on a whiteboard surface. The radiating source may radiate radiation generated by the radiation source or may reflect radiation from other sources. The radiation may be in the visible light spectrum or in other spectrums, such as the ultraviolet or infrared spectrums. The embodiments described herein are exemplary only and other implementations and configurations of optical sensors are also possible.

Figure 3:
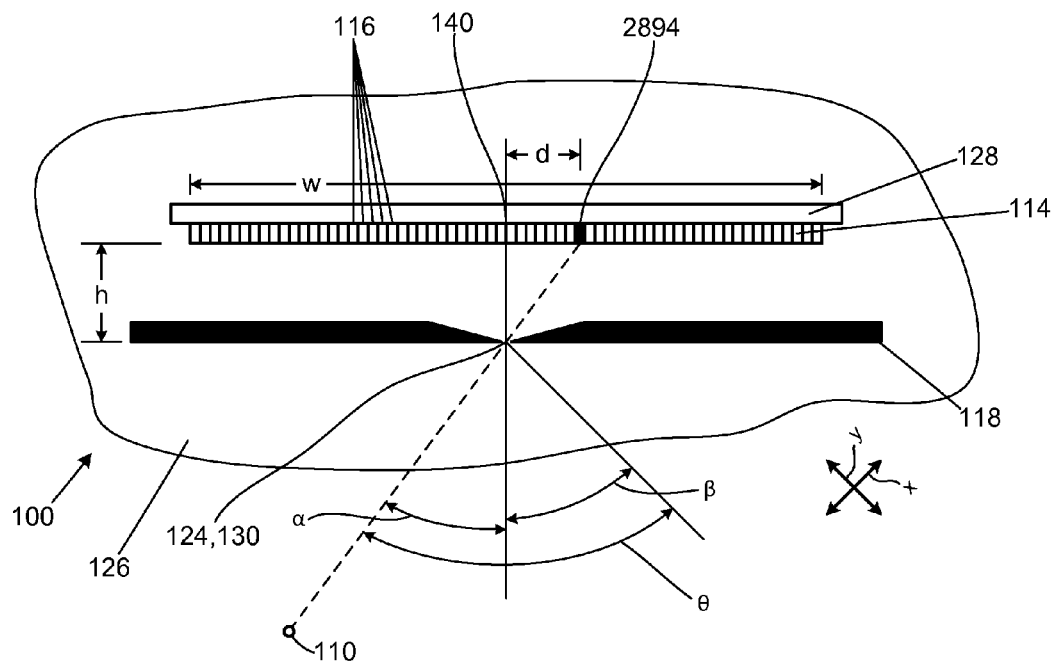
FIG. 3 is a cross-sectional top-view of the sensor of FIG. 1.

Reference is first made to FIGS. 1, 2 and 3, which illustrate a position sensor 100 and a radiation source 110. Radiation source 110 emits radiation 112 that is incident on the sensor 100. A radiation source is described herein as emitting radiation regardless of whether the radiation source simply reflects radiation produced by another radiation source or the radiation source generates radiation which then propagates away from the radiation source. In some embodiments, radiation source 110 may be a passive source which reflects radiation initially produce by another radiation source. For example, radiation source may be a reflective source that simply reflects radiation towards sensor 100. In some embodiments, radiation source 110 may be an active radiation source such as a LED, a light bulb or other source.

Sensor 100 includes a linear sensor array 114, an aperture plate 118 and a processor 120. Linear sensor array 114 is mounted on a sensor support 128, which is in turn mounted on a base plate 126. The aperture plate 118 is also mounted on base plate 126.

Sensor array 114 has a plurality of sensor elements 116 that are arranged linearly. Each of the sensor elements 116 is sensitive to radiation emitted by radiation source 110 positioned in a sensing region 111. For example, sensor array 114 may be a linear CMOS sensor that is sensitive to visible or infra-red radiation emitted by radiation source 110. Sensor array 114 is coupled to processor 120. Sensor array 114 provides an intensity signal 122 (FIG. 3) to the processor 120.

Aperture plate 118 has a aperture 124 formed in it such that radiation emitted by radiation source 110 is incident on only some of the sensor elements 116. In this embodiment, aperture 124 is a slit, allowing the radiation source 110 to be moved in the z dimension and still emit radiation onto sensor 100 through aperture 124. In other embodiments, the aperture may be a hole or may have another shape. In some embodiments, the shape (including the size) of the aperture may be selected based on the sensitivity, shape and spacing of the sensor elements 116.

The sensing region 111 is the range of space in which a radiation source 110 can emit radiation that will be incident on a sensing element 116 through the aperture 124. The sensor elements 116 are arranged generally parallel to the plane of the sensing region 111. As radiation source 110 moves in the x or y dimensions in the sensing region 111 relative to sensor 100, radiation emitted by the radiation source 110 passes through aperture 124 and is incident on different sensor elements 116.

In some embodiments, an optical filter may be used to limit the frequency band of radiation incident on the sensor array 114. Referring to FIGS. 2 and 3, an optical filter may be positioned in front of aperture 124 (as shown in FIG. 2), or between aperture 124 and the sensor array 114 to reduce the amount of extraneous radiation reaching sensor element 116. For example, a filter may allow only radiation in a frequency range corresponding to radiation emitted by the radiation source 110 to reach the sensor elements 116. In some embodiments, an optical notch filter may be used to block undesirable radiation from reaching the sensor elements 116. Using an optical filter can improve the operation of sensor 100, for example, by increasing the signal-to-noise ratio in an intensity signal.

Figure 4:
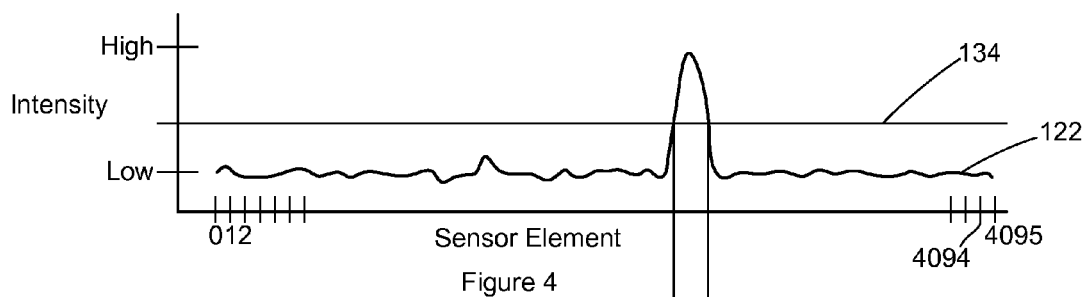
FIG. 4 illustrates an intensity signal from the sensor of FIG. 1.

FIG. 4 illustrates an example intensity signal 122. Intensity signal 122 is an analog signal provided by sensor array 114. Intensity signal 122 generally has a low intensity level corresponding to most sensor elements 116 on which little or no radiation from radiation source 110 is incident. Intensity signal 122 has a relatively high intensity level corresponding to sensor elements 116 upon which radiation from radiation source 110 is incident.

In various embodiments, the dimensions and spacing of the sensor elements 116 and the aperture 124 may be such that only one or a few sensor elements 116 may have radiation from radiation source 110 incident upon them. In other embodiments, the aperture 124 may be shaped to allow radiation from radiation source 110 to be incident on a larger number of sensor elements.

Figure 5:
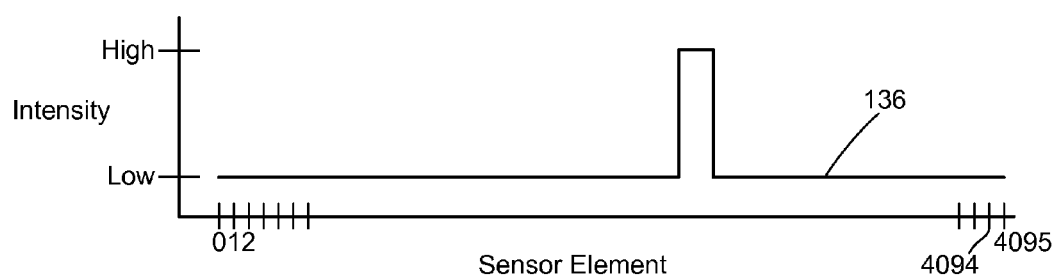
FIGS. 5 and 6 illustrate other example intensity signals.
Figure 6:
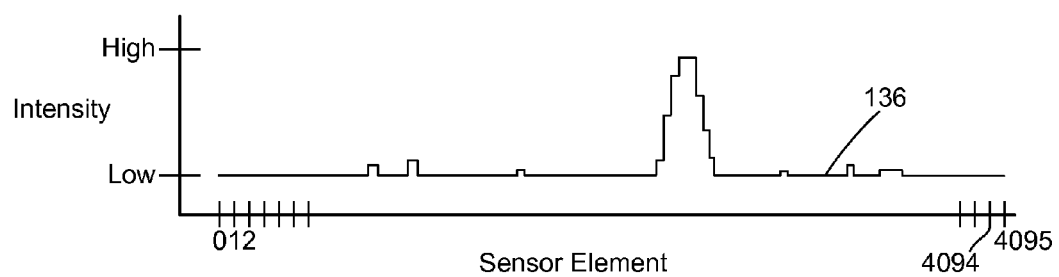

In various embodiments, the intensity signal 122 may be an analog signal or a digital signal (or a combination of both). In embodiments in which the intensity signal is a digital signal, intensity levels corresponding to specific array elements may have two or more values. For example, FIG. 5 illustrates an intensity signal 122 in which intensity levels are at either a high level or a low level depending on whether the radiation incident on each sensor element is below or above a threshold. In other embodiments, the intensity of the radiation incident on each sensor element may be reported as an intensity level within a range of values. For example, FIG. 6 illustrates an intensity signal in which an intensity level between a low value and a high value is provided for each sensor element. The low value may be 0 and the high value may be 255, if eight bits are provided for reporting the intensity level for each sensor element.

Figure 7:
FIG. 7 illustrates a final intensity signal based on the signal of FIG. 4.

Referring again to FIG. 4, in this embodiment, intensity signal 122 is a raw intensity signal that is converted into a final intensity signal 136 by processor 120. In this embodiment, processor 120 is configured to do so in the following manner. Processor 120 first estimates a threshold value for distinguishing between background levels of radiation and higher levels of radiation emitted by radiation source 110. This may be done for example, by identifying the most common intensity level (a modal value) and setting the threshold at a level between than the modal intensity level and the peak levels of the raw intensity signal. The raw intensity signal 122 may be a bi-modal signal and the threshold may be set at a level between the two modal values. In other embodiments, this may be done by calculating the average intensity level (a mean value, which will typically be between the background radiation level and the level of radiation emitted by the radiation source 110. In other embodiments, the threshold level may be selected in another manner. A threshold level 134 is calculated in this example as follows:

Threshold Level 134=(Peak Intensity Level−Average Intensity Level)*30%+Average Intensity Level Referring to FIGS. 4 and 7, the final intensity signal 136 has a high intensity for sensor elements that had an intensity level exceeding the threshold 134 in the raw intensity signal and a low intensity level for sensor element that had an intensity level at or below the threshold in the raw intensity signal.

Typically, the final intensity signal 136 will have a range of intensity levels at the high level corresponding to sensor elements on which radiation from radiation source 110 is incident through aperture plate 118. In this embodiment, the processor then identifies a center sensor element in the middle of the range of sensor elements for which the final intensity signal 136 has a high level. In the example of FIGS. 4 and 7, sensor array has 4096 sensor elements and the intensity levels for sensor elements 2883 to 2905 are high in the final intensity signal 136. Sensor element 2894 is the center element, as is shown in FIG. 3.

In some embodiments, the center element may be calculated directly from the raw intensity signal. The process for selecting the center element from the final intensity signal 136 may also be used to calculate a center element directly from digital intensity signal that has only two values, as illustrated in FIG. 5. In other embodiments, the center element may be calculated in other ways. For example, if the sensor provides a range of intensity level, as shown in FIGS. 4 and 6, the processor may be configured to select the sensor element with the highest sensor intensity level. In some embodiments, the processor may filter the raw or final intensity signal to remove spurious values. For example, an intensity signal may be filtered to remove high intensity levels for one or a small number of sensor elements that are surrounded by low intensity levels. The aperture plate and the geometry of the sensor array 118 may be arranged such that radiation from the radiation source 110 will illuminate a group of sensor elements. If a small group of elements, fewer than should be illuminated by the radiation source, have a high intensity level and are surrounded by sensor elements with a low intensity level, the group of elements may be treated as having a low intensity level.

Referring again to FIG. 1, sensor 100 is positioned at a predetermined angle relative to the x-y plane. In this embodiment, sensor 100 is positioned at a 45° angle to the x and y dimensions. Processor 120 receives the intensity signal 122 and determines an angle θ (FIG. 1) at which radiation from radiation source 110 is incident on the sensor 100.

Processor 120 determines angle θ based on the center sensor element. This may be done using a variety of geometric or computing techniques or a combination of techniques.

A geometric technique is illustrated on FIG. 3. Processor 120 determines angle θ relative to a reference point, which will typically be within the dimensions of sensor 100. In some embodiments, the reference point may be outside the dimensions of sensor 100. In the present embodiment, angle θ is determine relative to reference point 130, which is at the centre of aperture 124. The sensor array is positioned a distance h from the aperture plate with the centre 140 of the sensor array directly behind reference point 130. Center sensor element 2894 is spaced a distance d from the centre 140 of the sensor array. Angle θ may be calculated as follows:

$$\angle \theta = \angle \alpha + \angle \beta$$
$$= \tan^{-1}(d/h) + 45°$$

In some embodiments, a lookup table may be used to determine angle θ. Angle 8 may be calculated in advance for every sensor element 116 in the sensor array 114 and the result may be stored in a lookup table that is accessible to processor 120. Processor 120 may then lookup angle θ after the center element has been identified.

Collectively reference point 130 and angle θ define a ray 132 along which radiation source 110 is located relative to sensor 100.

Figure 8:
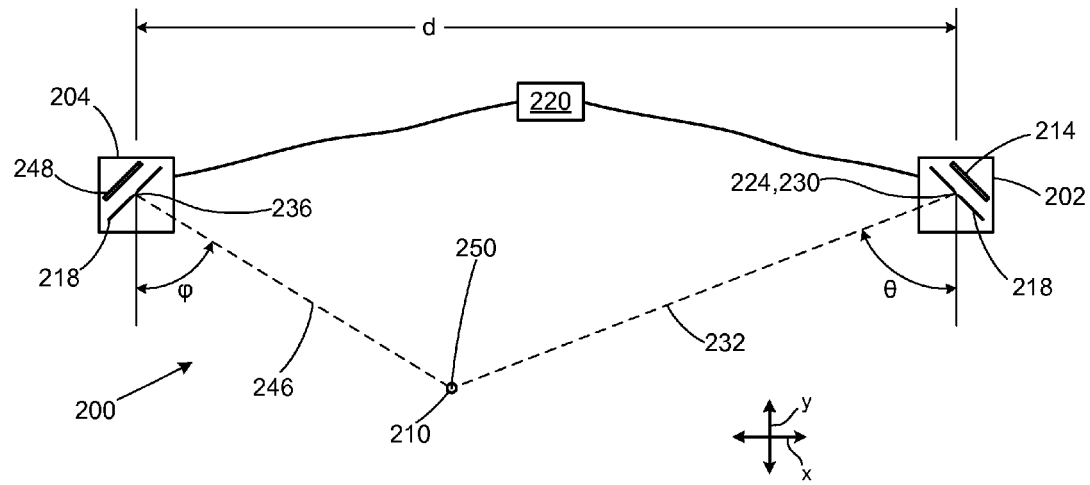
FIG. 8 illustrates a system for estimating the position of a radiation source.

Reference is next made to FIG. 8, which illustrates a system 200 for estimating the position of a radiation source 210 relative to an x-y plane. System 200 includes a pair of sensors 202 and 204, which are similar to sensor 100. Sensor 202 has a reference point 230. Ray 232 passes through reference point 230 and is at an angle θ from the y-dimension. Sensor 204 has a reference point 236. Ray 246 passes through reference point 236 and is at an angle φ relative to the y dimension. Radiation source 210 lies at the intersection of rays 232 and 246. Sensors 202 and 204 may share a processor 220 such that their respective sensor arrays 214 and 248 provide an intensity signal to the processor 220. Processor 220 calculates rays 232 and 246 in the manner described above in relation to ray 132 and FIG. 3. Processor 220 may calculate the rays in any manner, including the lookup table technique described above.

Rays 232 and 246 lies on the x-y plane. Processor 220 calculates the intersection point 250 at which rays 232 and 246 intersect. The intersection point 250 is an estimate of the position of the radiation source 210.

Reference point 236 is located at the origin of the x-y plane and is at point (0,0). Reference points 236 and 230 are separated by a distance d in the x dimension such that reference point 230 is at point (d,0). Processor 220 calculates angles θ and φ as described above. Radiation source 310 is located at point $(x_p, y_p)$. The estimated position of the radiation source 210 is calculated as follows:

$$x_p = \frac{d \cdot \tan\varphi}{\tan\varphi + \tan\theta}$$

$$y_p = x_p \cdot \tan\varphi$$

Processor 220 may be configured to estimate the position of radiation source 210 repetitively. As the radiation source is moved about, its estimated position is recorded, providing a record of the movement of the radiation source. Optionally, processor 220 may provide the current or recorded (or both) to an device coupled to the processor.

Figure 9:
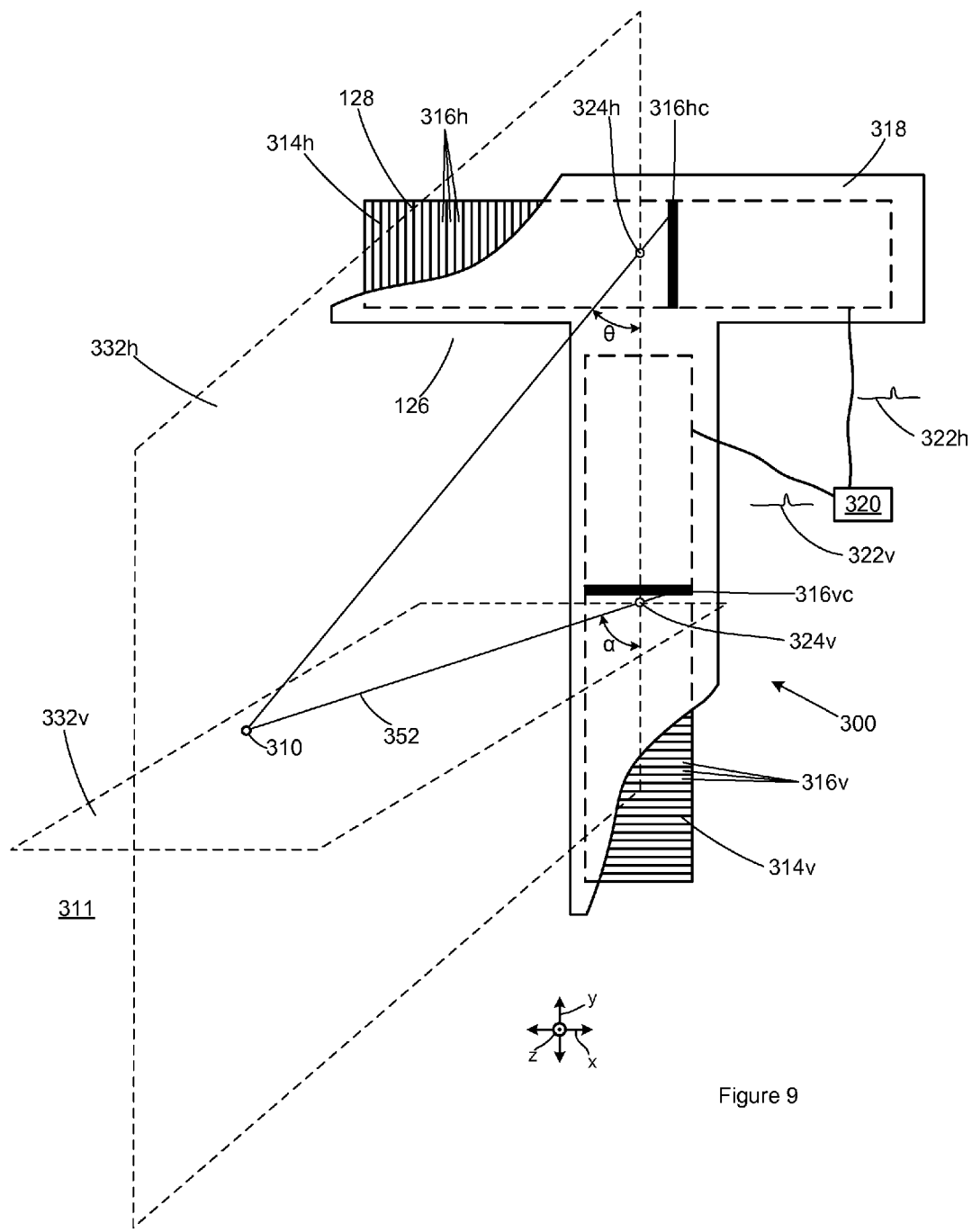
FIG. 9 illustrates a first whiteboard system according to the present invention.

Reference is next made to FIG. 9, which illustrates a two-dimensional position sensor 300. Sensor 300 has two sensor arrays 314h and 314v, each of which is a linear array sensor having sensor elements 316h and 316v that sense radiation emitted by a radiation source 310. Each sensor array 314h, 314v is positioned behind an aperture plate 318. A radiation source 310 is positioned in three dimensional sensing region 311, spaced in the z-dimension from the sensor 300. Aperture plate 318 has an aperture 324h formed in it, and aligned with the centre of sensor array 314h to allow radiation from radiation source 310 to be incident on only some of the sensor elements 316h. Similarly, aperture plate 318 has an aperture 324v that is aligned centrally with sensor array 314v to allow radiation from radiation source 310 to be incident on only some of the sensor elements 316v. In this embodiment, apertures 324h, 324v are circular.

Sensor arrays 316h and 316v are arranged orthogonally. Sensor elements 316h extend vertically (in the y dimension) such that radiation passing through aperture 324h remains incident on the sensor elements 316h as radiation source 310 moves in the y and z dimensions (the z dimension is perpendicular to the plane of FIG. 9). Similarly, sensor elements 316v extend in the x dimension such that radiation from radiation source 310 remains incident on the sensor elements 316v as radiation source 310 moves in the x and z dimensions.

Sensor arrays 314h, 314v each provide an intensity signal 322h, 322v to a processor 320.

Processor 320 identifies a central sensor element 316hc based on intensity signal 322h as described above in relation to intensity signal 122 (FIGS. 4 and 7). Processor 320 calculates a plane 332h based on a reference point 330h and the central sensor element 316hc. Reference point 330h is at the center of aperture 324h. Plane 332h is parallel to the y-axis and passes through the center sensor element 316hc and reference point 230h. Plane 332h is at an angle θ from the z-axis. Plane 332h may be calculated using geometric or computational techniques, as described above.

Processor 320 also identifies a central sensor element 316hv based on intensity signal 322v. Processor 320 calculates a plane 332v based on reference point 330v and central sensor element 316hv. Reference point 330v is at the center of aperture 324v. Plane 332v is parallel to the x-axis and passes through the central sensor elements 316hv and the reference point 330v. Plane 332v is at an angle α from y-axis.

Processor 320 then calculates a line of intersection 352 between planes 332v and 332h. Radiation source 310 lies on or near the line of intersection 352.

Figure 10:
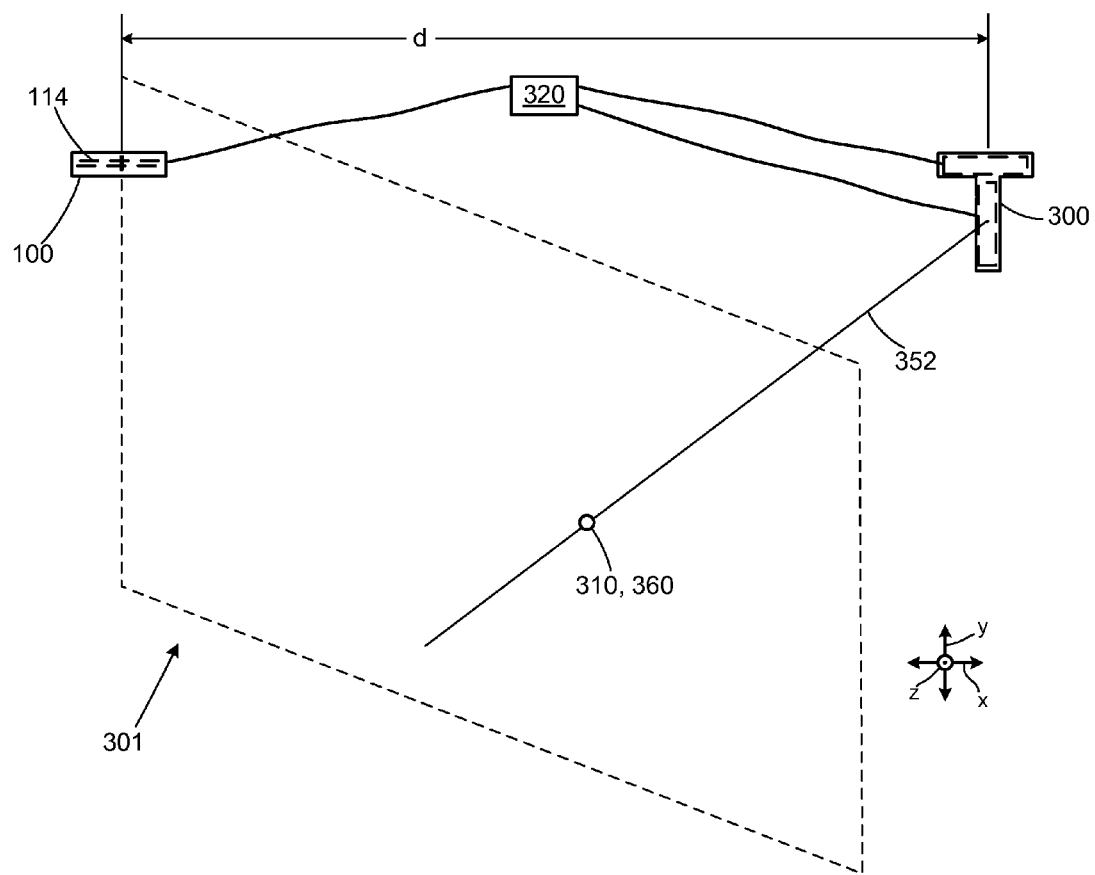

Reference is next made to FIG. 10, which illustrates a position sensing system 301 for estimating the position of radiation source 310 in three dimensional space by combining a two-dimensional sensor 300 and a one-dimensional sensor 100. In this embodiment, the sensor array 114 of sensor 100 is coupled to processor 320 in place of processor 120 (FIG. 1). Sensors 100 and 300 are separated by a known distance d. Sensor 300 is used as described above to estimate a line 352. Radiation from radiation source 310 is also incident on sensor 100. Processor 320 receives an intensity signal from the sensor array 114 and identifies a center sensor element 116 as described above. Processer 320 calculates a plane 358 that is parallel to the y-axis and passes through the center sensor element 116 (FIG. 3) and the reference point 130 (FIG. 3) of sensor 100. Processor 320 calculates the intersection 360 of plane 358 with line 352 and the point of intersection is an estimate of the position of the radiation source 310 in three-dimensional space.

The embodiment of FIG. 10 illustrates a three-dimensional position sensing system 301, which is an example of the use of three sensors (which may share a single processor) estimate the position of a radiation source in three-dimensions. More generally, three sensors, such as sensor 100, may be used to calculate three planes based on the incidence of radiation from the radiation source on each of the sensor. The processor calculates a point at the intersection of the three planes. The radiation source is estimated to be at the point of intersection.

The accuracy of the estimated position of the radiation source can be affected by the orientation of the three sensors. For example, if the linear sensor arrays of two of the sensors are co-linear or almost co-linear, two of the planes calculated by the processor will or may be parallel or may not intersect close to the radiation source. The three linear sensors are preferably positioned such that their respective sensor arrays are not co-linear.

Figure 11:
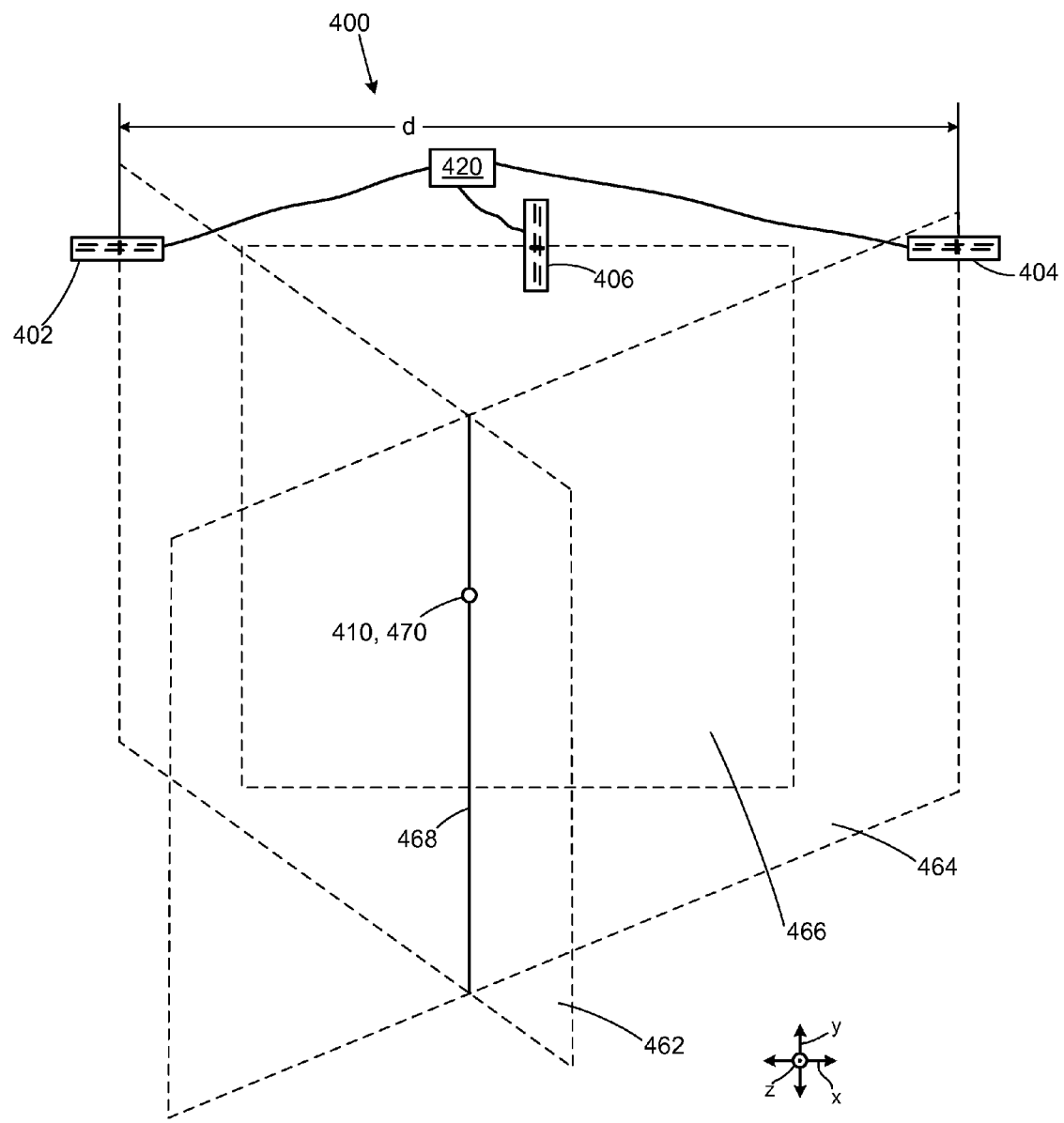

In some embodiments, two of the sensor arrays may be parallel while the third sensor array is orthogonal to the parallel sensor arrays. FIG. 11 illustrates a three-dimensional position sensing system 400. One-dimensional sensors 402, 404 and 406 share a processor 420. Sensors 402 and 404 are co-linear and parallel to the x-axis. Sensor 406 is parallel to the y-axis. Radiation form radiation source 410 is incident on all three sensors. Processor calculates planes 462, 464 and 466 based on intensity signals received, respectively from sensors 402, 404 and 406. Planes 462 and 464 intersect at line 468. Plane 466 intersect planes 462 and 464 at point 470, which is an estimate of the position of radiation source 410.

Figure 12:
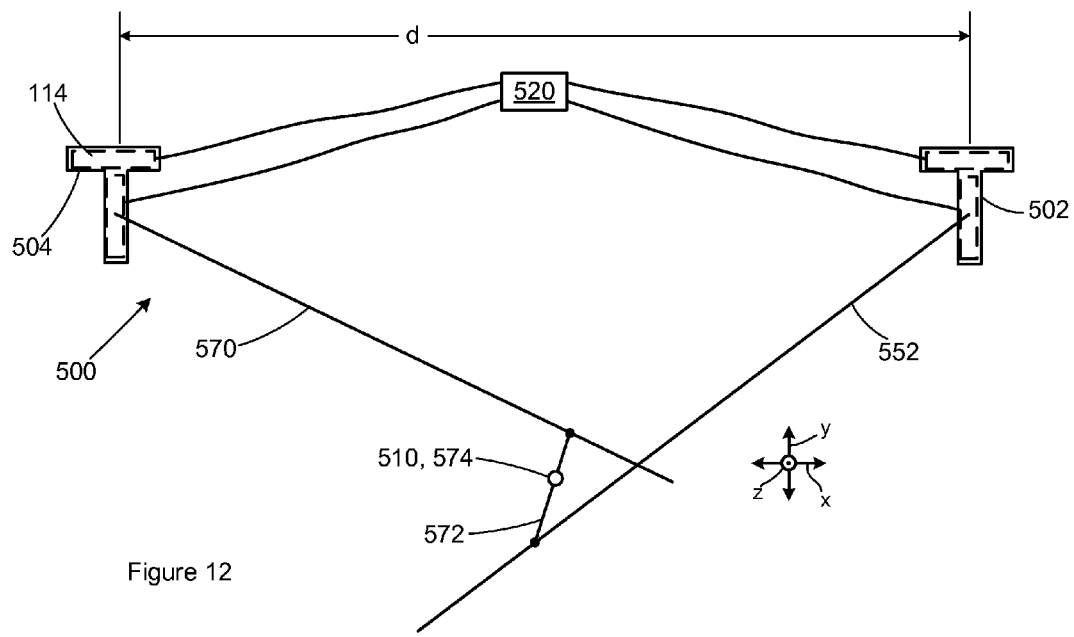
FIGS. 10 to 12 illustrate several three-dimensional position sensing systems.

Reference is made to FIG. 12, which illustrates another three-dimensional position sensing system 500. System 500 has two sensors 502 and 504 similar to sensor 300 (FIG. 9). Each sensor has two sensor arrays (as described above in relation to sensor 300) and each of the sensor arrays is coupled to a processor 520. Processor 520 calculates a line 552 based on intensity signals received from sensor 502 and a line 570 based on intensity signals received from sensor 502, in the manner described above in relation to sensor 300. Radiation source 510 lies on or near each of the lines 552 and 570. In this embodiment, processor 520 calculates the shortest line segment 572 between lines 552 and 570. Radiation source 510 is estimated to be at the midpoint 574 of line 572.

The present invention has been described here by way of example only. Various modification and variations may be made to these exemplary embodiments without departing from the spirit and scope of the invention.

The invention claimed is:

1. A method of estimating the direction of a radiation source positioned in a sensing region, the method comprising:
   providing a two-dimensional radiation sensor, the radiation sensor comprising:
      a first linear array sensor having a plurality of first sensor elements arranged linearly, the first sensor elements facing the sensing region;
      a second linear array sensor having a plurality of second sensor elements arranged linearly, the second sensor elements facing the sensing region;
      an aperture plate positioned between the first and second linear array sensors and the sensing region to block radiation from the sensing region from reaching the first and second linear array sensors;
      a first aperture formed in the aperture plate to allow radiation from the sensing region to reach one or more of the first sensor elements; and
      a second aperture formed in the aperture plate to allow radiation from the sensing region to reach one or more of the second sensor elements;
   receiving a first intensity signal from the first linear array sensor, wherein the first intensity signal includes first intensity values corresponding to radiation incident on the first sensor elements through the first aperture;
   receiving a second intensity signal from the second linear array sensor, wherein the second intensity signal includes second intensity values corresponding to radiation incident on the second sensor elements through the second aperture; and
   determining the direction based on the first and second intensity signals, wherein:
   the first radiation intensity signal includes a first range of high intensity values corresponding to a range of first sensor elements exceeding a first threshold value; and
   the second radiation intensity signal includes a second range of high intensity values corresponding to a range of second sensor elements exceeding a second threshold value;
and wherein determining the direction includes:
   selecting a first center sensor element based on the first range of high intensity values in the first radiation intensity signal;
   selecting a second center sensor element based on the second range of high intensity values in the second radiation intensity signal; and
   determining a direction based on the first and second center sensor element.

2. The method of claim 1 wherein the first and second radiation intensity signals are analog signals and wherein determining the direction includes:
   converting the first radiation intensity signal into a corresponding first final radiation intensity signal;
   converting the second radiation intensity signal into a corresponding second final radiation intensity signal; and
   determining the direction based on the first and second final radiation intensity signals.

3. The method of claim 1 wherein the first and second radiation intensity signals are digital signals, and wherein the intensity values of the first and second radiation intensity signals correspond respectively to each of first sensor elements and to each of the second sensor elements, wherein each intensity value has either a high value or a low value.

4. The method of claim 1 including filtering the first and second radiation intensity signals to remove spurious values before determining the direction.

5. The method of claim 1 wherein determining the direction includes looking up a first angle corresponding to the first radiation intensity signal in a lookup table and looking up a second angle corresponding to the second radiation intensity signal in a lookup table.

6. The method of claim 1 wherein determining the direction includes calculating a first angle and calculating a second angle.

7. The method of claim 6 further including combining the first and second angles to determine the direction.

* * * * *